April 5, 1938.  C. GUINN  2,113,508
QUICK ACTION ROD COUPLING FOR PUMPING WELLS
Filed Sept. 21, 1936
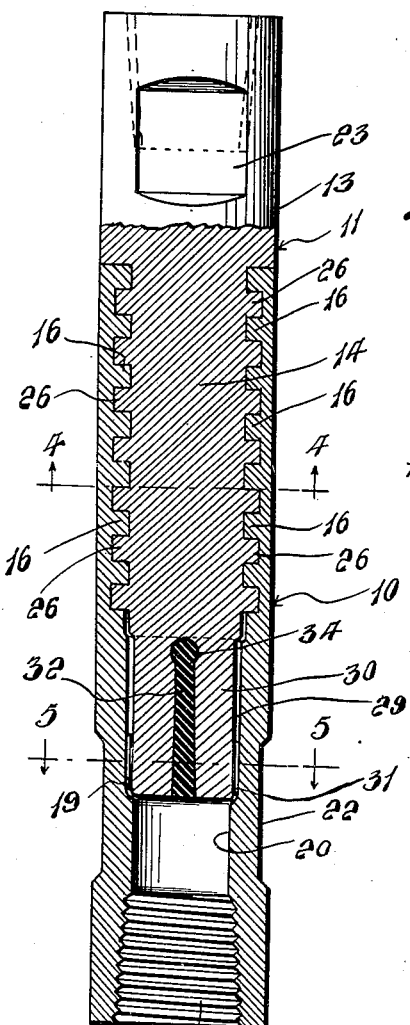
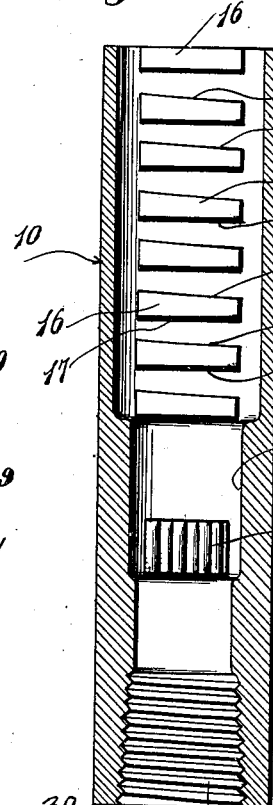
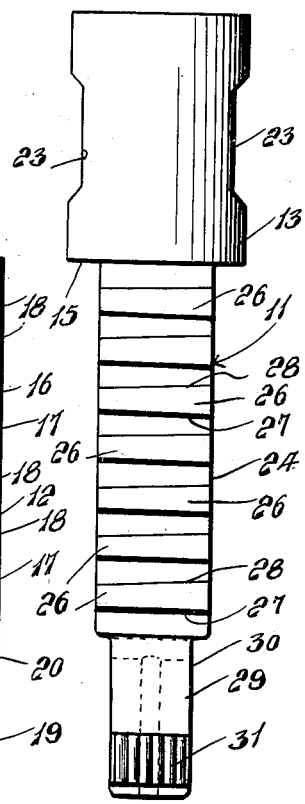
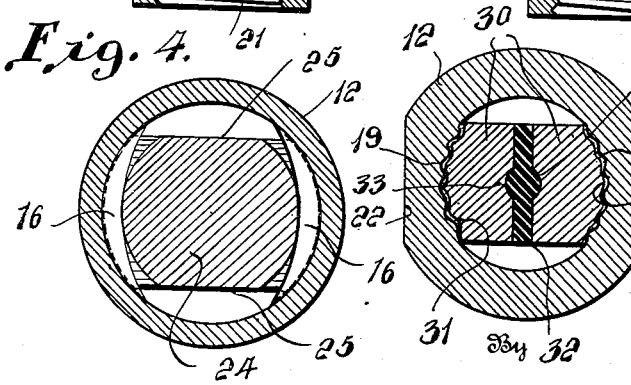
Inventor
Claude Guinn
By Bryant & Lowry
Attorneys Patented Apr. 5, 1938

2,113,508

UNITED STATES PATENT OFFICE 2,113,508

QUICK ACTION ROD COUPLING FOR PUMPING WELLS

Claude Guinn, Kilgore, Tex.

Application September 21, 1936, Serial No. 101,843

2 Claims. (Cl. 287—103)

This invention relates to certain new and useful improvements in a quick action rod coupling for pumping wells.

The primary object of the invention is to provide a quick action rod coupling for pumping wells wherein the sucker rod sections are connected together, the coupling providing a locking structure wherein wedge jaws or blocks are cooperatively formed upon a sleeve or box and stem with means for holding the wedge jaws or blocks in engaged position against accidental relative movement, the adjacent ends of sucker rods having threaded engagement with the outer ends respectively of the coupled stem and box.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a longitudinal sectional view of a quick action rod coupling for pumping wells constructed in accordance with the present invention and illustrating the interlocking wedge block connection between the male and female members of the coupling with a threaded socket respectively at the outer ends of the male and female members for the attachment of sucker rod sections;

Figure 2 is a longitudinal sectional view of the female member comprising the sleeve or box and illustrating the wedge blocks on the inner face of the box and the longitudinally extending corrugated or rib section spaced from the wedge block;

Figure 3 is a side elevational view of the male member or stem of the coupling showing wedge blocks and a longitudinally extending corrugated or ribbed section with the wedge blocks and corrugated section adapted for cooperation with corresponding parts within the box;

Figure 4 is a cross-sectional view taken on line 4—4 of Figure 1, showing opposite flattened sides on the male member or stem and the diametrically opposite wedge blocks;

Figure 5 is a cross-sectional view taken on line 5—5 of Figure 1, showing the bifurcated lower end of the male member or stem with a rubber insert block and the engaged longitudinally corrugated portions of the male and female members; and Figure 6 is a perspective view of the rubber insert block.

The quick action rod coupling is intended for coupling adjacent ends of sucker rods in a pumping well and as shown in Figures 2 and 3, comprises female and male members 10 and 11, the female member being in the form of a tubular element, sleeve or box 12 while the male member comprises a stem 14 having a shank of reduced diameter extending therefrom to define an abutment shoulder 15.

Diametrically opposite rows of longitudinally extending wedge blocks 16 project inwardly of the inner face of the box 12, the wedge blocks extending circumferentially of the box having straight lower sides 17 and tapering or wedge shaped upper sides 18. The internal diameter of the box 12 is reduced as at 20 below the wedge blocks 16 and diametrically opposite longitudinally extending corrugated sections 19 project inwardly of the inner face of the reduced portion 20 of the box, a corrugated section 19 being respectively aligned with each row of wedge blocks 16. The lower terminal end of the box 12 is internally threaded as at 21 to facilitate connection therewith of the threaded end of a sucker rod section. The reduced portion 20 of the box 12 adjacent the lower end thereof is diametrically flattened at the outer sides thereof as at 22 to facilitate gripping engagement of a wrench or other tool for coupling the male and female members of the coupling.

The male member of the coupling is shown in detail in Figure 3, the stem 13 being flattened as at 23 at diametrically opposite sides to facilitate gripping engagement of a wrench with the outer end of the stem socketed and internally threaded to facilitate connection therewith of the threaded end of a sucker rod section. The reduced shank 24 projecting from the stem 13 has diametrically opposite sides thereof as shown in Figure 4 flattened as at 25 and the other diametrically opposite sides of the shank 24 carry wedge blocks 26 that cooperate with the wedge blocks 16 within the box 12. As shown in Figures 1 and 4, the outer sides of the wedge blocks 16 on the stem 24 are arcuate, the lower sides of the wedge blocks 26 being straight as shown at 27 while the upper sides thereof taper or are of wedge shape as at 28, the male and female members 10 and 11 being so proportioned that when assembled, the wedge blocks 16 and 26 interfit with each other with the outer sides of the wedge blocks 16 contacting the shank 24 between the wedge blocks 16 while the outer curved faces of the wedge blocks 16 contact the inner face of the box 12 between the wedge blocks 16. The lower end of the shank 24 is reduced as at 29 and when positioned in the box 12 is spaced from the reduced portion 20 within the box, the reduced end 29 being bifurcated to provide resilient legs 30, the outer faces of which adjacent their lower ends are provided with longitudinally extending corrugated sections 31 to cooperate with the corrugated sections 19 within the box 12. An elastic or rubber key or block 32 has oppositely projecting longitudinally extending ribs 33 and a crosshead 34 for positioning between the bifurcated legs 30, the opposed faces of which are so designed to receive the ribs 33 and head 34 to hold the rubber block in position and to prevent the entrance of sand and other foreign matter upwardly into the coupling and also to aid in expanding the resilient bifurcated legs 30.

In assembling the male and female members of the coupling, the male member 11 is disposed to permit sliding insertion of the same into the female member 10, the male and female members being then rotated through an arc of 90° to effect interlocking engagement of the wedge blocks 16 and 26, the corrugated sections 19 and 31 ratcheting over each other and when the wedge blocks 16 and 26 have been fully moved to their wedging positon, the interfitting corrugated sections 19 and 31 prevent accidental relative rotation of the male and female members for holding the coupling in assembled relation.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:—

1. In a quick action coupling for pumping wells, male and female members respectively adapted to have sucker rods threaded therein, interfitting wedge blocks on the members, means for holding the wedge blocks in wedging engagement, said means including longitudinally extending corrugated sections respectively aligned with the wedge blocks and spaced inwardly thereof, the inner end of the male member being bifurcated to provide a pair of resilient legs with a corrugated section on the outer side of each leg and a rubber block between the legs to prevent entrance of sand and to aid in holding the corrugated sections on the legs in engagement with the corrugated sections on the female member.

2. In a quick action coupling for pumping wells, male and female members respectively adapted to have sucker rods threaded therein, interfitting wedge blocks on the members, means for holding the wedge blocks in wedging engagement, said means including longitudinally extending corrugated sections respectively aligned with the wedge blocks and spaced inwardly thereof, the inner end of the male member being bifurcated to provide a pair of resilient legs with a corrugated section on the outer side of each leg, and an expanding element between the resilient legs for spreading the legs and holding the corrugated sections on the legs in engagement with the corrugated sections of the female member.

CLAUDE GUINN.